United States Patent Office 3,540,886
Patented Nov. 17, 1970

3,540,886
ACIDIC PHOTOCONDUCTIVE RESIN BINDERS
Robert E. Ansel and Charles M. Taubman, Cook County, Ill., assignors to De Soto, Inc., Des Plaines, Ill., a corporation of Delaware
No Drawing. Filed June 25, 1968, Ser. No. 739,619
Int. Cl. G03g 7/00; B44d 1/00
U.S. Cl. 96—1.8                                                          10 Claims

ABSTRACT OF THE DISCLOSURE

The weight of the photoconductive coating on electrostatic copy paper is reduced by using as the binder resin for dispersing the usual zinc oxide particles a resin having an acid value of from 9 to 90 with the acidity being in a solution copolymer with at least 80% being selected from:
(A) monovinyl aromatic compound such as styrene;
(B) monovinyl ester such as vinyl acetate; and
(C) esters such as ethyl acrylate, at least 15% of the copolymer being from groups (A) and (B), and at least 15% being from groups (B) and (C) such as copolymers of 40–60% styrene or vinyl acetate with the balance except for the monoethylenic acid being acrylic ester.

---

The present invention relates to electrostatic copy paper coated with a zinc-oxide containing coating of improved character and particularly to copy paper providing good print quality despite the fact that the coating weight is in the range of from about 15 to about 25 pounds per ream (3000 square feet), preferably less than about 20 pounds per ream instead of the approximately 30 pounds per ream which is normally considered to be essential.

Conventional electrostatic copy paper is constituted by an electrically conductive paper substrate bearing a photoconductive coating on a surface thereof, the photoconductive coating being constituted by a large proportion of zinc oxide particles held together by a small proportion of a binder resin. However, the density of the zinc oxide particles and the thick layer needed to permit an adequate charge to be retained in the dark has led to copy paper which is very heavy and expensive and which, because of the heavy coating, possesses poor feel.

The binder resins used in the art have been of diverse types, and small amounts of acid, less than an acid number of 8 have been used to improve wetting of the zinc oxide particles. Higher acidities have been avoided because, in the presence of the large proportion of zinc oxide needed, the viscosity of the composition increased rapidly and there was a tendency to gel. Even without gelation, the high viscosity would interfere with application of the normally desired coating weights using the high speed coaters needed for practical operation.

In the present invention it has been found that certain solution copolymers having the necessary electrical characteristics can be provided to include a larger proportion of copolymerized acid without causing instability in zinc oxide-pigmented organic solvent solution coating systems; that such solutions can be used in high speed coaters at greater than usual dilution to form electrostatic copy paper with lighter than usual coatings; and that these lighter coatings surprisingly yield print quality in electrostatic copying processes which is fully comparable to that previously associated only with much heavier coatings.

It is first desired to point out that resins of high acid value are generally to be avoided in zinc oxide-pigmented photoconductive coatings. Apparently, the zinc oxide is present in such large amount and includes at least some zinc metal that the resin molecules become cross-linked through the available carboxyl functionality causing viscosity instability and gelation. Thus, low molecular weight acidic materials such as maleinized oils at acid numbers as low as 8–10 and styrenated alkyds have gelled and high molecular weight copolymers such as suspension copolymers of vinyl acetate at an acid value of 15 have also gelled. It is thought that the acid distribution in the low molecular weight maleinized oils and styrenated alkyds was inappropriate and that the molecular weight in the suspension polymer was excessive. In any event, solution copolymers of the type described herein resist gelation in zinc oxide photoconductive coatings at higher acid number and, by appropriate selection of monomers and acidity, copolymers can be provided which are stable and yield good electrical characteristics, even at lower coating weight.

In the invention at least 80% of the weight of the copolymer must be selected from three classes of monoethylenic monomers as follows:

(A) monovinyl aromatic compound;
(B) monovinyl ester; and
(C) esters of monoethylenic carboxylic acid.

The ester groups referred to are hydrocarbon groups, preferably containing from 2–20 carbon atoms. Additionally, at least 15%, preferably at least 25% of the copolymer should be selected from groups (A) or (B) with no single compound constituting more than 85% of the copolymer. Lastly, at least 15%, preferably at least 25% of the copolymer should be monomers which include the ester group, e.g., be selected from groups (B) and (C).

The main monovinyl aromatic compound is styrene, but vinyl toluene is also appropriate, other compounds within the class can also be used such as t-butyl styrene, $\alpha$-methyl styrene, and chlorostyrene. These other compounds are preferably used in combination with styrene or vinyl toluene, but they can less desirably be used in place of them.

Vinyl acetate is the preferred vinyl ester, but vinyl propionate, vinyl stearate or the vinyl ester of other monocarboxylic acids such as $C_{10}$ neo acids known as Versatic acid can also be used. Again, and while these can be used in place of vinyl acetate, they are better used in admixture therewith.

The esters of monoethylenic carboxylic acids are preferably illustrated by esters of acrylic or methacrylic acid, but the specific selection of the unsaturated acid is of secondary significance as is the choice of the alcohol used for esterification. Preferred esters are methyl acrylate, ethyl acrylate, butyl acrylate, 2-ethylhexyl acrylate, methyl methacrylate, ethyl methacrylate and butyl methacrylate. Other useful esters are butyl crotonate, dibutyl maleate, di-2-ethylhexyl maleate, dibutyl itaconate and dibutyl fumarate.

Other ethylenically unsaturated materials are preferably absent, but small proportions can be tolerated such as: acrylamide, methacrylamide, acrylonitrile, methacrylonitrile, vinyl pyrrolidone, methyl, ethyl or butyl vinyl ether, methyl vinyl ketone, hydroxy ethyl acrylate or methacrylate and the like. Even small amounts of unsaturated polyesters may be present so long as solvent solubility is not unduly reduced.

The monoethylenically unsaturated acid used to provide the desired acidity can be of diverse nature, acrylic and methacrylic acids being preferred, but other similar acids such as crotonic acid, maleic acid, fumaric acid itaconic acid and the like can also be used including partial esters such as monobutyl fumarate or maleate. Mixtures of these acids can also be used. The interpolymerized acid should constitute the bulk of the copolymer acidity. Even unsaturated sulfonic or phosphonic acids such as sulfoethyl methacrylate may be used.

Curiously, homopolymers are not operative. Thus, polystyrene or polyvinyl acetate do not work, but copolymers of the two with either in predominant amount are excellent. Similarly, polyethyl acrylate is inoperative, but a mixture of 80% ethyl acrylate with 20% of styrene or vinyl acetate is acceptable. Thus, the selection of materials presented hereinbefore is necessary. Particularly preferred combinations are 40–60% styrene or vinyl acetate with the balance being chosen from ethyl, butyl and 2-ethylhexyl acrylate. If viny lacetate is chosen, the vinyl ester of $C_{10}$ neo acid may also be present, in preferred practice.

In making combinations of the monomers noted hereinbefore, it will be understood that some of these will be difficult to copolymerize with one another, but to the extent that the copolymers can be made, and almost all can be easily made, they will function in accordance with this invention. The acidity of the copolymer should provide an acid number in the range of from 9 to 90, preferably from 12 to 40.

Mixtures of copolymers can also be used so long as the copolymer acidity provides a total acidity within the ranges set forth above.

The invention is restricted to solution copolymers, a term which identifies the fact that the bulk of the copolymerization takes place in organic solution medium as opposed to polymerization in the substantial absence of solvent, e.g., in bulk or in suspension or emulsion. Polymerization in solution embraces the situation in which the solvent is suspended in a non-solvent, e.g., water. Here, even when some polymerization takes place in the aqueous medium, the growing polymer dissolves in the suspended organic solvent particles and much of the polymerization takes place therein.

Speaking generally, solution polymers have a molecular weight below 100,000 while bulk polymerization produces molecular weights above 100,000 which tend to gel in the invention.

Moreover, the tendency to gel is aggravated by increasing acidity. Accordingly, the higher the acidity, the lower the molecular weight should be to insure viscosity stability in zinc oxide-pigmented coatings. Molecular weight can be lowered where desired by various techniques such as copolymerization at higher temperature, in the presence of a larger proportion of catalyst, by using a larger proportion of organic solvent, by solvent selection and by using chain terminating agents such as mercaptans.

The resin binder is preferably used in organic solvent solution in any of the common inert solvents such as toluene, benzene, xylene, methyl ethyl keton, butanol, and mixtures thereof. A typical solvent system is exemplified by a 50:50 weight ratio mixture of xylene and toluene. Alcoholic solvents and especially n-propanol are desirably present in amounts of 5–40% based on the total weight of solvent, but larger amounts are not preferred.

The zinc oxide which is incorporated into the resin binder solution is preferably in an extremely fine state of subdivision as is well known in the art, a Hegman N.S. value of 5 in the pigmented resin solution being typical of preferred practice.

The proportion of zinc oxide in the binder solution may vary within broad limits, the only restrictions being that the amount must be sufficient to provide adequate conductivity in the film upon exposure to light and yet allow sufficient binder to maintain the integrity of the film. Broadly speaking, a zinc oxide to binder ratio of at least 4 to 1 and preferably of at least 5 to 1 is desirable to provide the desired conductivity upon exposure; however, a zinc oxide to binder ratio of up to 30 to 1 allows sufficient binder to maintain a degree of film integrity, although the ratio is preferably less than 10 to 1.

The photoconductive coating is also desirably formulated to include certain sensitizers to render the coatings adequately photoconductive over the range of visible light. Examples of sensitizers are sodium fluorescein, methylene blue, and brom phenol blue, these being merely illustrative and not forming any part of the present invention which does not directly depend upon the wave length of light used for exposure of the agents used as sensitizers.

Since free radical generating catalyst and addition copolymerization are quite conventional and well known, an extended discussion thereof is omitted, though a brief discussion of the solution polymerization of preferred materials will be given.

The vinyl acetate interpolymers are prepared in general by a solution polymerization in water suspension. A polymerization medium (100 to 400% of monomer charge) consisting of from 10% toluene and 90% water to 90% toluene and 10% water, preferably between 15% and 50% toluene, is placed in a polymerization vessel along with 5 to 40%, preferably 10–20%, of the monomers and initiators which have been previously premixed. The polymerization is carried out in the presence of from 1–5% (based on monomer) of oil soluble and/or water soluble vinyl polymerization initiator of the free radical type, preferably from 1.5% to 3%. The mixture of polymerization medium and monomer precharge is heated to reflux and the remaining monomer mixture is added over a period of from one to five hours. Upon completion of the polymerization, the water and organic layers are allowed to separate, additional solvent added to bring the solids to 40 to 50%, and the water drained off. Any residual water is removed by azeotropic distillation.

The styrene-acrylic interpolymers are prepared, in general, by a typical solution polymerization. A polymerization medium (50 to 200% of monomer charge) consisting of aromatic solvents such as, but not limited to, benzene, toluene, and xylene, is placed in a polymerization vessel along with 5 to 40% preferably 10 to 20% of the monomer and initiator which have been previously premixed. The polymerization is carried out in the persence of from 1 to 5% (based on monomers) of vinyl polymerization initiators of the free radical type, preferably from 1.5 to 3%. The mixture of polymerization medium and monomer precharge is heated to reflux and the remaining monomer mixture is added over a period of from one to five hours. Upon completion of the polymerization more solvent may be added to bring the system to a desired viscosity and non-volatile resin level.

As an illustration of the unexpected efficiency obtained from copolymers of higher acidity when used as zinc oxide resin binders, two styrene-acrylic copolymers differing only in acid content were blended with the same low acid value (2 to 3) vinyl acetate terpolymers and made into a zinc oxide coating. A blend of the two resin binders (at 50% nonvolatile resin) in toluene, 82.6 grams, was added to 290 grams of zinc oxide and 227.4 grams of toluene (55% nonvolatile coating) and ground in a Waring Blendor to approximately 7 to 8 Hegman. The coatings were then sensitized with 16 p.p.m. Brom phenol Blue, 35 p.p.m. sodium fluorescein and 8 p.p.m. Methylene Blue (all based on zinc oxide pigment) and drawn down on electrophotographic paper at approximately 15 lbs. of coating per 3000 sq. ft. The results are reported in Table I.

TABLE I

| Resin | Maximum charge acceptance, volts | Residual,[1] volts | Light decay[2] | Coating, cps. | Remarks |
| --- | --- | --- | --- | --- | --- |
| Equi-weight mixture of Resins 1 and 2[3] (control) | 465 | 53 | 0.67 | 27 | ([4]) |
| Equi-weight mixture of Resins 1A[5] and 2 (experimental) | 526 | 51 | 0.73 | 62 | ([6]) |

[1] Residual—residual charge remaining after light exposure.
[2] Light decay—slope of the decrease in charge acceptance, after exposure to light, normalize to 400 volts.
[3] Resin 1—styrene-acrylic terpolymer (acid number 7–8); resin 2—vinyl acetate terpolymer (acid number 2–3).
[4] Poor high relative humidity performance. Poorer fill and print than experimental.
[5] Resin 1A—styrene-acrylic terpolymer (acid number 15–16).
[6] Better high relative humidity performance fill and print properties better than control and acceptable for use in commerce.

These figures indicate an increase in charge acceptance and speed (light decay) for systems containing a high acid resin. These increases are substantiated by the improved quality of the developed copy.

Improvements in such properties as cleaner background, better fill in dark areas and sharper prints are shown by high acid containing resin systems in comparison to typical commercial systems.

The following are specific illustrative procedures for making acid containing resin solutions which can be pigmented with zinc oxide at a pigment to binder ratio of 8.5:1 to provide photoconductive coatings useful in this invention at 20 pounds per ream.

EXAMPLE 1

To a stirred 3 liter flask equipped with a reflux condenser, thermometer, nitrogen inlet and monomer addition inlet was added 150 gm. toluene and 700 gm. of water. A monomer premix was prepared by mixing 356 gm. vinyl acetate, 119 gm. ethyl acrylate, 119 gm. the vinyl ester of $C_{10}$ neo acid, 6 gm. maleic anhydride, and 6 gm. benzoyl peroxide. A portion of the monomer premix, 121 gm. (20%) was added to the flask initially with 2 gm. of benzoyl peroxide and the system was heated to reflux. The remainder of the monomer premix was then added continuously over a 90 minute period. Approximately 30 minutes after the addition was complete 1 gm. of decanoyl peroxide was added and the system was held at reflux until the temperature reached 88 to 89° C. The heating was then stopped and 450 gm. of toluene was added, stirring stopped and the water-toluene layers separated. The water layer was drained off and the toluene layer was azeotropically dried and then cooled to yield a slightly viscous solution of a vinyl acetate copolymer with the following characteristics. Non-volatile solids, 47.2%; acid number, 17.3; and a Brookfield viscosity of 136 cps. (determined with #4 spindle at 40% non-volatile resin and 50 r.p.m.).

EXAMPLE 2

To a stirred 3 liter flask equipped with a reflux condenser, a thermometer, nitrogen inlet and monomer addition inlet was added 650 gm. of xylene. A monomer premix was prepared by mixing 495 gm. styrene, 485 gm. ethyl acrylate, 20 gm. acrylic acid, 7 gm. benzoyl peroxide and 8 gm. ditertiary butyl peroxide. A portion of the monomer premix, 202 gm. (20%) was added to the flask initially and the system was heated to reflux. The remainder of the monomer premix was then added continuously over a 90 minute period. Two hours after the addition was complete the solution was cooled and poured yielding a viscous material of the following characteristics: Non-volatile solids, 59.7%; acid number, 15.0; and Brookfield viscosity (determined with #4 spindle at 20 r.p.m.) 7470 cps.

EXAMPLE 3

To a stirred 3 liter flask equipped with a reflux condenser, thermometer, nitrogen inlet and monomer addition inlet was added 425 gm. toluene. A monomer premix was prepared by mixing 590 gm. vinyl acetate, 195 gm. vinyl ester of $C_{10}$ neo acid, 195 gm. ethyl acrylate, 20 gm. acrylic acid, 10 gm. benzoyl peroxide and 10 gm. t-butyl perbenzoate. A portion of the monomer premix, 204 gm. (20%) was added to the flask initially and the system was heated to reflux. The remainder of the monomer premix was then added continuously over a 5 hour period. The solution was held at reflux for 10 hours after monomer addition with the addition of 2 gm. portions of t-butyl perbenzoate 2 hours and 6 hours after monomer addition was complete. A viscous solution was obtained with the following characteristics: Non-volatile solids, 56.6%; acid number, 16.4; and Brookfield viscosity, 580 cps. (determined with #4 spindle at 50 r.p.m.).

The invention is defined in the claims which follow.

We claim:

1. Electrostatic copy paper comprising an electrically conductive paper substrate bearing a photoconductive coating on a surface thereof, said coating comprising finely divided zinc oxide particles dispersed in an insulating resin binder, said binder having an acid value of from 9 to 90 with the bulk of the acidity being present in a solution copolymer containing copolymerized monoethylenic acid with at least 80% of the weight of the copolymer being selected from:
   (A) monovinyl aromatic compound;
   (B) monovinyl ester; and
   (C) esters of monoethylenic carboxylic acid, said esters in components (B) and (C) being hydrocarbons, at least 15% of the copolymer being selected from groups (A) and (B) with no single compound in either of said groups (A) and (B) constituting more than 85% of the copolymer and at least 15% of the copolymer being selected from groups (B) and (C).

2. Electrostatic copy paper as recited in claim 1 in which said coating weighs from about 15 to about 25 pounds per ream.

3. Electrostatic copy paper as recited in claim 2 in which said copolymerized acid is a carboxylic acid and said binder has an acid value of from 12 to 40.

4. Electrostatic copy paper as recited in claim 3 in which said coating comprises from 5 to 10 parts by weight of zinc oxide per part of resin binder and said coating weighs from about 15 to about 20 pounds per ream.

5. Electrostatic copy paper as recited in claim 1 in which at least 25% of the copolymer is selected from groups (A) and (B) and at least 25% of the copolymer is selected from groups (B) and (C).

6. Electrostatic copy paper as recited in claim 1 in which from 40–60% of the copolymer is styrene.

7. Electrostatic copy paper as recited in claim 1 in which from 40–60% of the copolymer is vinyl acetate.

8. Electrostatic copy paper as recited in claim 1 in which said component (C) is constituted by $C_2$–$C_{20}$ esters of monoethylenic monocarboxylic acid.

9. Electrostatic copy paper as recited in claim 1 in which said copolymer comprises acrylic or methacrylic acid.

10. Electrostatic copy paper as recited in claim 1 in which said photoconductive coating further includes a small proportion of sensitizers to improve sensitivity to visible light.

References Cited
UNITED STATES PATENTS

| | | | |
|---|---|---|---|
| 3,128,204 | 4/1964 | Schaum et al. | 96—1.8 XR |
| 3,364,021 | 1/1968 | Hazen | 96—1.5 XR |
| 3,378,370 | 4/1968 | Brancato | 96—1.8 |
| 3,469,977 | 9/1969 | Savage | 96—1.5 |

WILLIAM L. JARVIS, Primary Examiner

U.S. Cl. X.R.

117—201

Disclaimer 3,540,886.—*Robert E. Ansel* and *Charles M. Taubman*, Cook County, Ill. ACIDIC PHOTOCONDUCTIVE RESIN BINDERS. Patent dated Nov. 17, 1970. Disclaimer filed Dec. 17, 1971, by the assignee, *DeSoto, Inc.*

Hereby enters this disclaimer to all the claims of said patent.

[*Official Gazette June 13, 1972.*]